(12) United States Patent
Donescu et al.

(10) Patent No.: US 7,734,751 B2
(45) Date of Patent: Jun. 8, 2010

(54) METHOD OF ALLOCATING A SERVICE BY A FIRST PEER TO A SECOND PEER IN A COMMUNICATION NETWORK

(75) Inventors: Ioana Donescu, Rennes (FR); Pascal Viger, Coesme (FR); Frédéric Maze, Rennes (FR); Eric Nassor, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 1249 days.

(21) Appl. No.: 10/781,772

(22) Filed: Feb. 20, 2004

(65) Prior Publication Data

US 2004/0184478 A1 Sep. 23, 2004

(30) Foreign Application Priority Data

Feb. 27, 2003 (FR) .................................. 03 02407

(51) Int. Cl.
*G06F 15/173* (2006.01)
(52) U.S. Cl. ...................... 709/223; 715/700
(58) Field of Classification Search ................. 709/230, 709/225, 204, 227, 231, 243; 348/14.08; 370/469, 236; 707/10; 713/153
See application file for complete search history.

(56) References Cited

U.S. PATENT DOCUMENTS

| | | | |
|---|---|---|---|
| 6,347,095 B1 * | 2/2002 | Tang et al. ................... 370/469 |
| 6,628,843 B1 * | 9/2003 | Eschbach et al. ............ 382/274 |
| 6,839,769 B2 * | 1/2005 | Needham et al. ............ 709/243 |
| 6,853,398 B2 * | 2/2005 | Malzbender et al. ..... 348/14.09 |
| 7,028,074 B2 * | 4/2006 | Ye et al. ...................... 709/204 |
| 7,088,681 B2 * | 8/2006 | Ladegaard ................... 370/236 |
| 7,136,927 B2 * | 11/2006 | Traversat et al. ............ 709/230 |
| 7,154,621 B2 * | 12/2006 | Rodriguez et al. ......... 358/1.15 |
| 7,457,946 B2 * | 11/2008 | Hind et al. ................... 713/153 |
| 2002/0054578 A1 | 5/2002 | Zhang et al. ................ 370/328 |
| 2002/0141499 A1 * | 10/2002 | Goertzen ............... 375/240.12 |
| 2003/0128987 A1 * | 7/2003 | Mayer .......................... 398/98 |
| 2004/0010614 A1 * | 1/2004 | Mukherjee et al. .......... 709/231 |
| 2004/0143666 A1 * | 7/2004 | Xu et al. ...................... 709/227 |
| 2004/0153458 A1 * | 8/2004 | Noble et al. ................... 707/10 |

OTHER PUBLICATIONS

M. Alfano, "Design and implementation of a cooperative multimedia environment with QoS control", Computer Communications, Elsevier Science Publishers BV, Amsterdam, NL, vol. 21, No. 4, Apr. 10, 1998, pp. 350-361.
M. Findeli, "Peer-to-Peer (P2P) Networking", Jul. 1, 2001, <URL:http://findeli.com/docs/p2p.pdf>.
V. Berk, et al., "File Sharing Protocols: A Tutorial On Gnutella", Institute For Security Technology Studies, Dartmouth College, Hanover, NH, Mar. 6, 2001, pp. i-15.

* cited by examiner

*Primary Examiner*—Dustin Nguyen
(74) *Attorney, Agent, or Firm*—Fitzpatrick, Cella, Harper & Scinto

(57) ABSTRACT

A method of allocating at least one service by a first peer (E) to a second peer (D), the peers being linked by means of a computer communication network, the first and second peers belonging respectively to a first and second group of peers adapted to share data, comprises the following steps:
  evaluating (E63) a distance (d0) between the first peer (E) and the second peer (D); and
  selecting (E65) a service allocated by the first peer (E) according to the value (d0) of the distance.

23 Claims, 12 Drawing Sheets

METHOD OF ALLOCATING A SERVICE BY A FIRST PEER TO A SECOND PEER IN A COMMUNICATION NETWORK

BACKGROUND OF THE INVENTION

1. Field of the Invention

The present invention concerns a method of allocating a service by a first peer to a second peer.

It also concerns an allocation device adapted to implement the method according to the invention.

2. Brief Description of the Related Art

In general terms, the present invention concerns the communication of electronic files, and in particular digital images, on communication networks.

More precisely, the present invention concerns communication networks having a peer-to-peer (or station-to-station) architecture.

In this type of network, several computers are connected together and each computer or terminal can be both server or client on the communication network. In such a communication network, the data are stored in a distributed fashion, the place of storage then being able to be considered to be almost unlimited.

In such a system, each terminal is identified uniquely. One or more users are associated with each terminal. Conversely, a given user can be connected through the peer-to-peer network from several terminals. Each user is also identified uniquely by means for example of an electronic address.

Each terminal and a user of the network thus forms a peer in the network. It should be noted here that several peers in the network can be connected to the same user.

Each peer belongs to a group of peers adapted to share data.

By way of example, such a communication and data exchange system is encountered in particular in the context of the exchange of personal digital data, of the network type referred to in English as F2F (or "Friends to Family").

In such a communication network, the main drawback compared with a "client-server" model is that the server or servers for a content requested on the network is or are not always connected.

It is therefore advantageous to store the data in a redundant fashion on several terminals so as to be able to satisfy a data request, even if the source of the initial data is not connected.

In parallel, in this type of network in which the data are not public, it is desirable to preserve these data and to leave, at the choice of the user, the possibility of allocating the service of all or some of its data.

In particular, in a group of peers as defined above, each peer has the possibility of sharing a set of data, also referred to as a collection, with a subset of peers which it knows, several of these peers possibly being able to represent the same user.

In addition, at each terminal, a user has the possibility of recreating a collection from data received, by mixing for example data received from various sources.

This collection will once again be shared with other peers forming part of the group of peers to which this second peer belongs.

In such a system, access to the content of the data is therefore not controlled by the initial possessor of the data.

It is thus necessary in such a network to allow access to shared data, even when the source terminal for these data is disconnected from the network, whilst at the same time restricting this access in order to protect the rights of each peer sharing these data.

A completely distributed digital document communication system is known, functioning without a central server; this communication system, known as GNUTELLA, is adapted to propagate each content request emanating from terminal to the connected adjacent terminals, with a predetermined depth within the connection graphic.

A description of this GNUTELLA system will be found in the document entitled "File Sharing Protocols: a Tutorial on Gnutella", V. Berg and G. Cybenko, March 2001, Technical report, Institute for Security Technology Studies, Darmouth College, Hanover, USA.

This depth is either fixed as a parameter of the system, or fixed by the user of the terminal initiating the content request.

Consequently the server peers do not have direct control over this parameter.

In addition, since it is a case of the propagation of a request in a connection graphic of the communication network, a disconnected node may compromise the obtaining of the result.

SUMMARY OF THE INVENTION

The present invention aims to resolve the aforementioned drawbacks and to propose a compromise ensuring on the one hand a certain quality of service in a peer-to-peer network and on the other hand restriction of access to the content of each peer in the network.

To this end, the present invention concerns a method of allocating at least one service by a first peer to a second peer, the peers being connected by means of a computer communication network, the said first and second peers belonging respectively to a first and second group of peers adapted to share data.

According to the invention, this allocation method comprises the following steps:

evaluating a distance between said first peer and said second peer; and selecting a service allocated by the first peer according to the evaluated distance.

Thus the allocation method according to the invention enables any peer in the communication network to serve another peer even if this second peer does not belong to the same groups of peers adapted to share data.

It is thus possible to access data even if the peers directly known to a second peer are not connected to the network.

In addition, because of the value of the distance, each peer intended to supply a service can restrict access to its data independently on the communication network.

The service associated with the distance between two peers in the communication network can thus be determined independently by each peer, according to criteria peculiar to each pair having to allocate a service on the communication network.

According to various embodiments of the invention, the evaluation step comprises:

a step of receiving a notification addressed by a central server of the computer communication network, the notification comprising the value of said distance and an identifier for the said second peer on the computer communication network; or a step of reading the value of the distance associated with the said second peer amongst a list of associations of peers and distances ; or a step of receiving an electronic ticket addressed by the said second peer comprising an identifier of the said second peer and the distance between the first and second peer.

According to a preferred characteristic of the invention, at the step of selecting a service, the service is chosen from amongst a set of associations consisting of a service and a distance.

It is thus possible, for each link value, to associate a different service, determined by the peer which is to allocate this service.

This set of associations is preferably bounded by a threshold value, so that, beyond a certain distance separating two terminals in a computer network, no service can be allocated by a peer.

In a particularly practical embodiment of the invention, the shared data can be represented by several resolution levels, and the allocated services correspond to various resolution levels for data to be shared between a first group and a second group of peers.

It is thus possible to modify the content of the data, offering these data at various resolution levels according to the distance separating two peers.

In practice, the more the peers are separated in the communication network, the lower the quantity of information associated with the data to be shared.

In a particularly advantageous manner, these data to be shared are digital images, which can be represented at various resolution levels.

Alternatively, when these shared data are compressed digital images to the JPEG 2000 format, the services allocated correspond to various levels of visual quality of the data to be shared between a first and second group of peers.

The present invention also concerns a device for allocating at least one service by a first peer to a second peer, the peers being connected by means of a computer communication network, the first and second peers belong respectively to a first and second group of peers adapted to share data.

According to the invention, this allocation device comprises:
- means of evaluating a distance between said first peer and said second peer; and
- means of selecting a service allocated by said first peer according to the evaluated distance.

This allocation device has advantages and characteristics similar to those described above in relation to the allocation method which it implements.

This allocation device is preferably incorporated in a terminal of a computer communication network.

The present invention also relates to a computer comprising means adapted to implement the allocation method according to the invention.

It also concerns a communication network comprising means adapted to implement the method of allocating a service according to the invention.

Moreover, the present invention relates to an information storage means, possibly totally or partially removable, which can be read by a computer system, and comprising instructions for a computer program adapted to implement the method of allocating a service according to the invention when this program is loaded in and executed by the computer system.

At the same time, it concerns a computer program which can be read by a microprocessor, comprising portions of software code adapted to implement the service allocation method according to the invention when it is loaded in and executed by the microprocessor.

The advantages and characteristics of this computer, this communication network, this information storage means and this computer program are similar to those of the service allocation method which they implement.

Other particularities and advantages of the invention will also emerge from the following description.

BRIEF DESCRIPTION OF THE DRAWINGS

In the accompanying drawings, given by way of non-limiting examples.

DETAILED DESCRIPTION OF THE PREFERRED EMBODIMENTS

An example of a hybrid peer-to-peer network adapted to implement the service allocation method according to the invention will be described first of all with reference to FIG. 1.

This thus relates to a hybrid "peer-to-peer" distributed communication system, each peer being able to be both client and server, the role of a central server S being minimized compared with a conventional client-server communication system.

Such a distributed communication system is encountered in particular in the exchange of personal digital data, such as for example digital photos or videos, in a system where various terminals can be connected together.

The data are thus stored in a distributed manner, rather than in a centralized manner, and are generally presented in a redundant fashion on several terminals.

It may be a case of non-public data, such as for example pieces of music or video.

In such a network, each terminal is identified uniquely, for example by means of a network address.

A user and his terminal thus form a peer in the network, the user being able to be identified for example by an electronic address and the terminal by an identifier generated by the system, which makes it possible to form an identifier for each peer in the system.

From this identification of peers, each peer has a list of acquaintances corresponding to the peers with which it regularly exchanges data.

Each user at each terminal also has the possibility of sharing a set of data, referred to as a collection, with a subset of these acquaintances.

Each data content is also associated with a unique identifier. This identifier is linked to the semantic content of these data and is the same whatever the resolution and/or quality level or levels of the data stored in a file. A collection is a set of identifiers associated with data.

In addition, each user has the possibility of recreating a collection from data received by mixing, for example, data received from several terminals with personal data.

This new collection can also once again be shared on the communication network with the various acquaintances of the peer.

Figure 1:
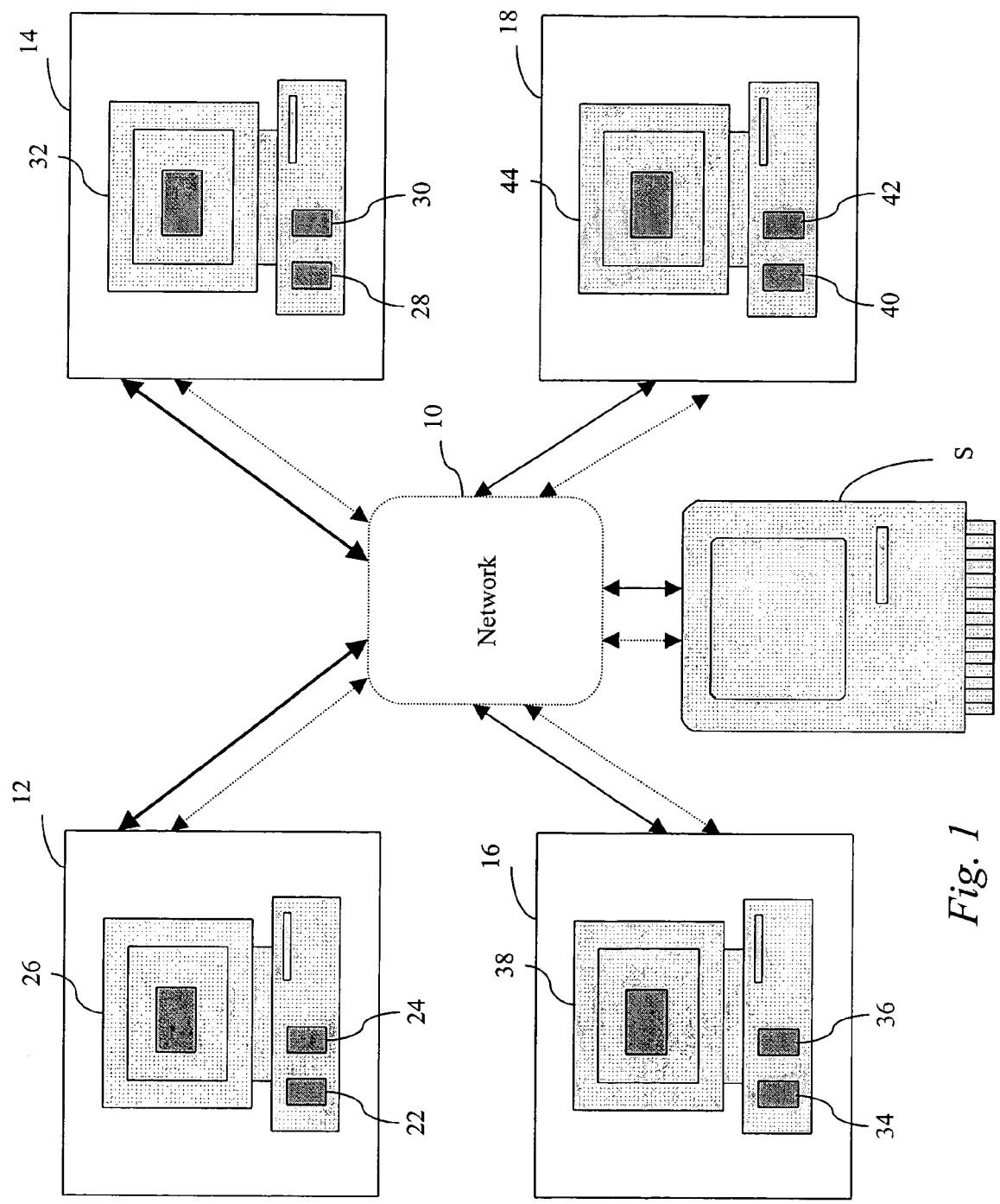
FIG. 1 is an example embodiment of a hybrid peer-to-peer network adapted to implement the allocation method according to the invention.

As illustrated in FIG. 1, such a network 10 comprises several terminals 12, 14, 16, 18, each terminal being connected to the network of the Internet type.

In addition, the network 10 comprises a central server S which makes it possible to store various items of information on the state of the peer-to-peer network and on the characteristics of the machines connected.

The server S can thus store the state of connection of the terminals 12, 14, 16, 18, and in particular know at any given time which terminals are connected.

In particular, for the terminals connected, the central server S also stores information concerning the network address of this terminal, as well as the ports used for the communications with the computer network.

The central server S is also adapted to store the identification and location of the data shared by the various terminals in the network.

Thus the central server contains information such as the identification of the data (for example of the collections of images) present on each terminal in the system.

One or more users can be associated with each terminal, each association of a terminal and user constituting a peer in the network.

As will be described in more detail with reference to FIG. 2a, the central server S also contains a set of information on the links existing between the network peers.

Unlike the other terminals, the central server S remains connected permanently.

It should be noted, however, that, although having a particular role, the central server S can also be considered to be one of the terminals in the distributed network.

Each terminal comprises in particular a volatile storage memory 22, 28, 34, 40, a file server 24, 30, 36, 42 and a man-machine interface 26, 32, 38, 44 which allows interaction between the users of each terminal.

It should be noted that the terminals can communicate directly or by means of the central server S.

An example of data sharing between various peers, denoted A to F, in the communication network will now be described with reference to FIGS. 2a and 2b.

Figure 2A:
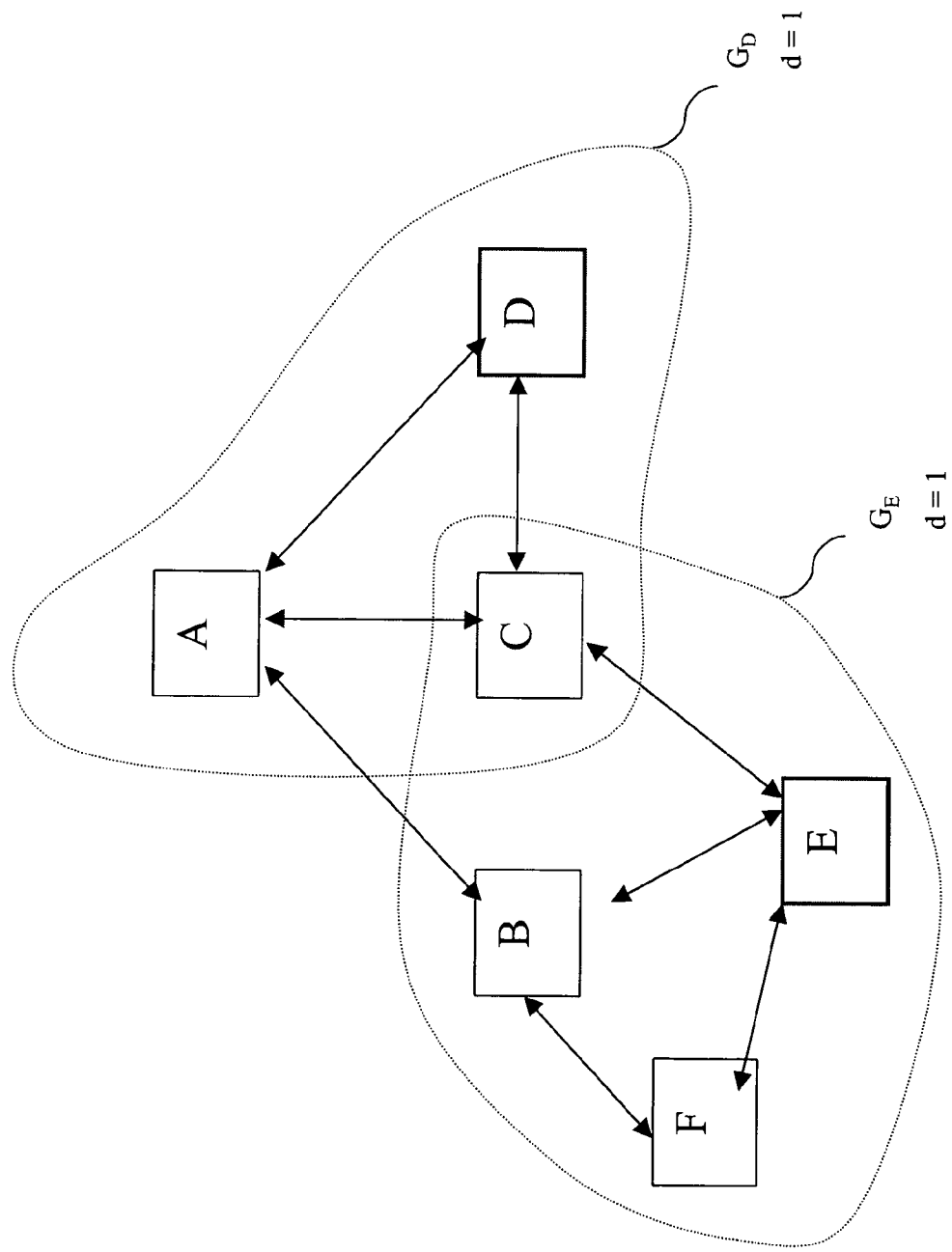
FIGS. 2a and 2b illustrate the sharing of data in a communication network as illustrated in FIG. 1.

FIG. 2a depicts schematically a relational graphic between the peers A to F in the network.

Such a graphic makes it possible to evaluate a link separating two peers in the communication network.

In this example, this link corresponds to the distance separating two given terminals in the communication network.

Thus, if the network is depicted in the form of a graphic, each identified peer A to F in the network constitutes a node in the graphic.

It is thus possible to define the value of a link as being the distance separating the nodes in the graphic, that is to say the minimum number of arcs which connect two nodes in the graphic representing respectively two peers in the communication network.

For example, in FIG. 2a, the distance between the peers D and E is equal to 2.

Each peer is generally adapted to share its data with a group of direct acquaintances, that is to say those having a link value equal to 1.

Thus the peer D belongs to a group of peers $G_D$ also comprising the peers A and C.

These peers A, C, D thus belonging to the same group of peers accept a relationship of direct exchanges, that is to say the respective sharing of their data.

On the other hand, the peer E belongs to another group of peers $G_E$ also comprising the peers B, C and F.

Thus the peers D and E belong to different groups of peers.

In this context, it is assumed that the peer A creates a collection of images C1 containing amongst other things an image C0.

Figure 2B:
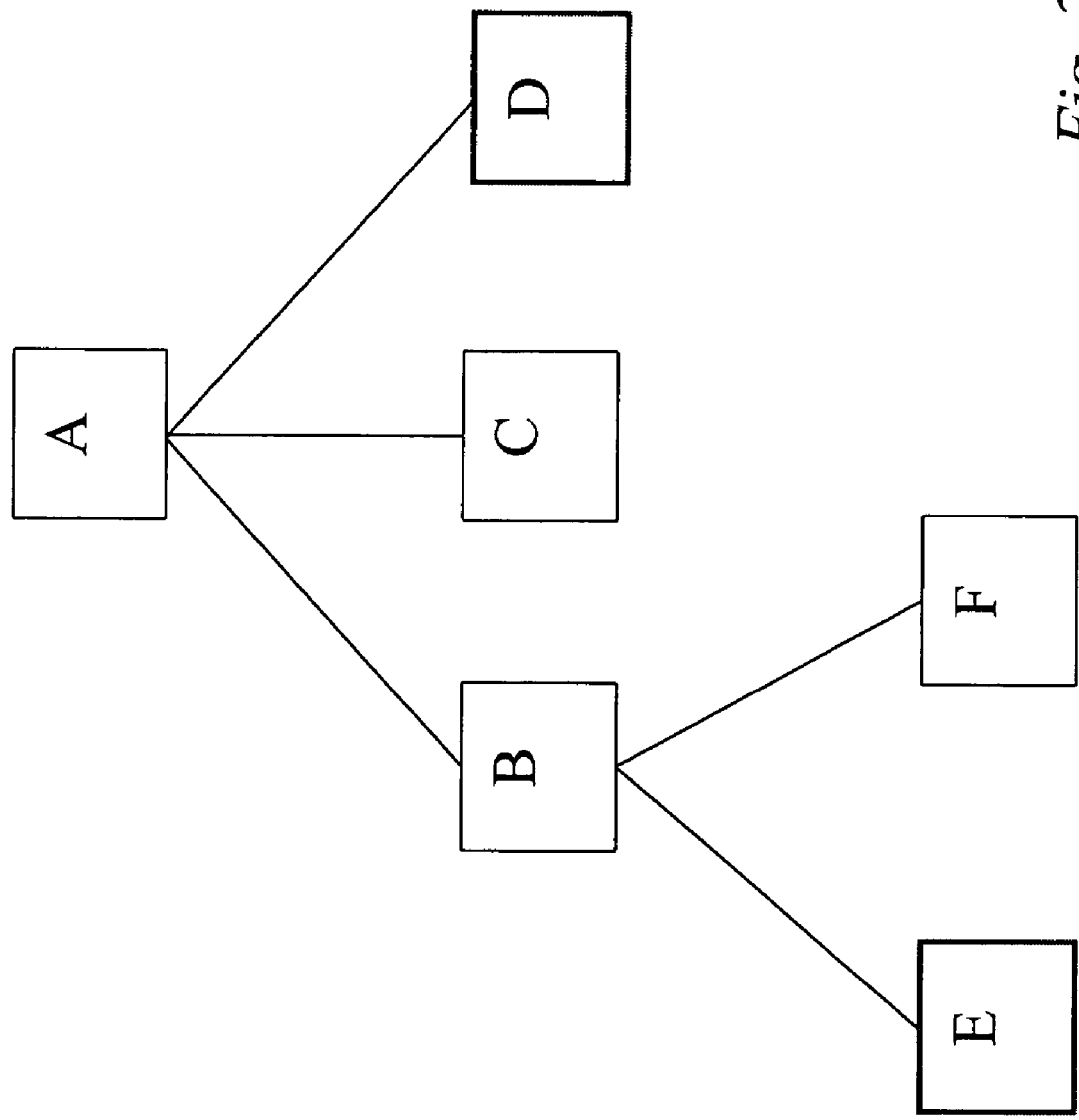

The peer A initially shares this collection C1 with the other peers B, C, D in the communication network, as illustrated in FIG. 2b.

In practice, in order to share these data, the peer A sends, via the communication network, a notification referencing this new collection C1 to the peers B, C, D.

When these peers B, C, D request and receive this new collection C1, they store it in their memory.

The peer B can then choose to include the image C0 in a new collection C2, containing other additional images.

This new collection C2 can then be shared with other peers E and F in the communication network.

However, when, after sharing the data, the user of the terminal A decides to disconnect, the collection C1 and in particular the image C0 are no longer available from this terminal A.

By way of example, if the user of the terminal D receives the notification of sharing of this new collection C1 and seeks for example to display the content of the image C0, he cannot gain access to this on the terminal A.

However, this image C0 is also present in the collection C2 stored at the terminal E, also connected to the network.

However, given that this image C0 is not received by the two terminals D and E at the same time, nor in the same collection, the peers D and E in the scenario described in FIG. 2a do not know each other so that the availability of the content C0 at the peer E is not known to the peer D.

The method described below with reference to FIG. 3 et seq resolves this problem.

The exchanges between a peer and the central server S when a connection of the peer to the communication network 10 is initiated will be described first of all with reference to FIG. 3, and according to a first embodiment of the invention.

Here it is a case of an initial connection of a peer to the network, so that all the information concerning it must be initialized.

Figure 4:
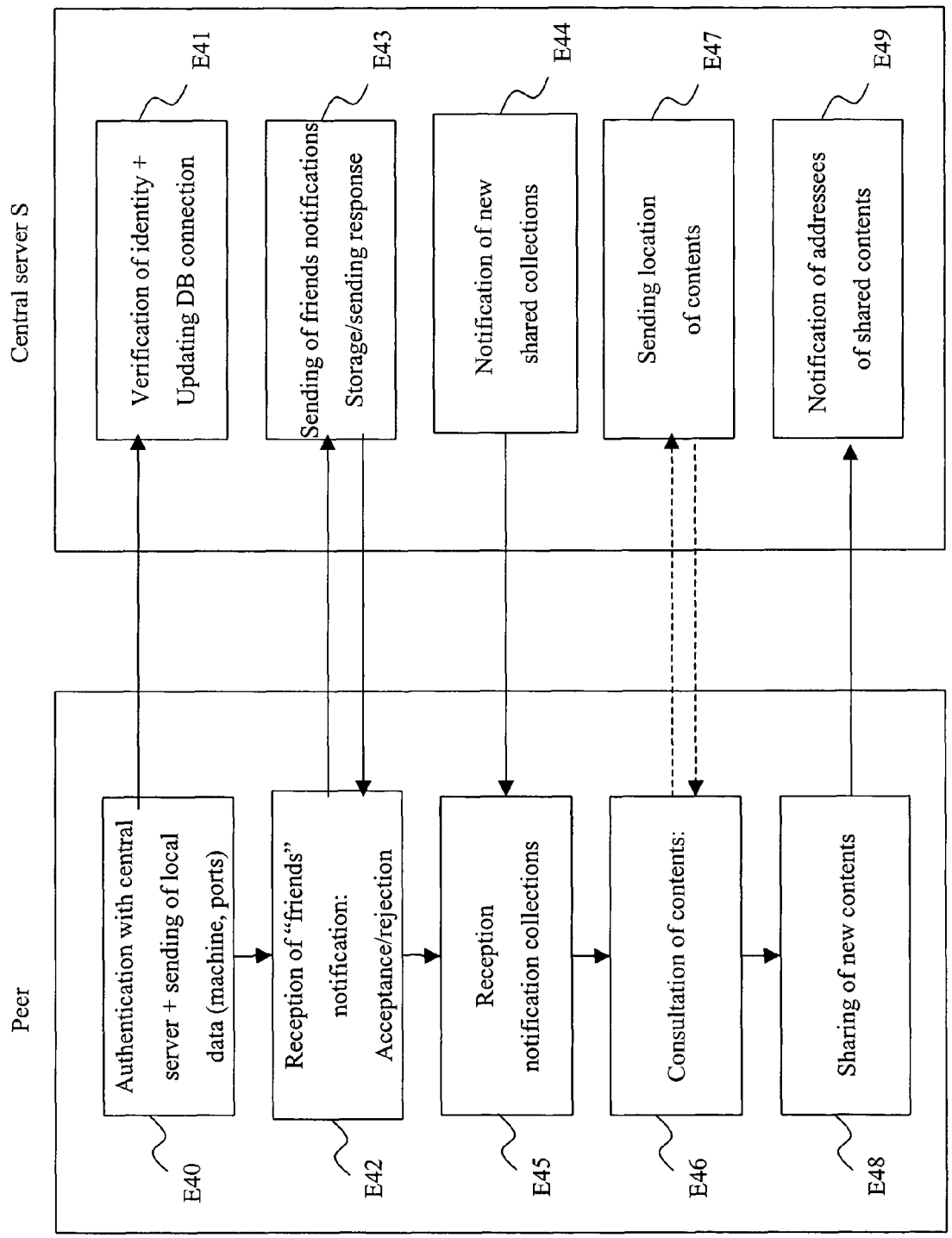
FIG. 4 is a block diagram illustrating the exchanges between a terminal and a server at the time of a subsequent connection of the said terminal.

During a subsequent connection, as described below with reference to FIG. 4, the peer is known to the system and only an updating of the preferences of the user and of the shared data must be performed.

When the peer is connected to the system, a first authentication step E30 is implemented.

In practice, the user supplies a name and a password which are stored in encrypted form at the central server S. The system also makes it possible to identify the terminal with a unique identifier, which is also transmitted to the server S.

A registration step E31 is thus implemented at the central server S in order to authenticate the peer in the network. When it is a first connection, the central server S associates a unique identifier Up of the peer in the system. This identifier Up is communicated to the peer. This identifier Up takes account both of the identifier of the terminal and the identity of the user. The network address of the terminal is then updated in a database of the server.

These mechanisms of registration and authentication with a server are known in the state of the art and do not need to be described in any further detail here.

Next an initialization phase E32 initializes the preferences of the user of the terminal amongst a choice of given preferences.

In a conventional manner, these preferences can comprise in particular the bandwidth authorized and the identification of a directory where shared data on the communication network are situated.

In addition, in accordance with the present invention, these preferences also comprise the type of service which the peer wishes to offer amongst a set of services available.

It is thus a question of giving the possibility to the user of choosing between various types of service which will then be allocated automatically by the terminal on the communication network.

In particular, the user chooses a threshold value, that is to say a distance dmax corresponding to a maximum distance in the communication network beyond which the peer does not allocate any service to another peer in the network.

It should be noted that, although the use of a threshold value dmax avoids saturating the communication network, it may possibly be accepted that each peer in the communication network can serve any other peer in the system.

Moreover, the initialization of the preferences also comprises a choice of services, to be associated with a distance d.

This is because a degressive service can then be allocated by each peer according to this distance d.

This degressive service can for example correspond to various resolution levels of the data to be shared when it is a case of images, or to various levels of quality of the image corresponding to the various quality layers existing in a compressed image data file to the JPEG 2000 format.

Alternatively, it could be envisaged that the service allocated by each terminal be a free service as long as the distance d remains below a certain value, and then becomes a barter system or a paid service beyond a certain link value d.

All these preferences are transmitted to the central server S and a registration step E33 makes it possible to store some of these preferences in a database, in association with the unique identifier $U_p$ of the peer.

An initialization step E34 is then implemented in order to establish a list of peers forming with the peer a group of peers adapted to share data.

These peers, also referred to as "friends", are distant by a distance d equal to 1 in the communication network and correspond to peers with which the information is shared directly, without service restriction.

During this initialization step E34, a first phase consists of requesting of the users of the other terminals their acceptance, since such a data exchange relationship is bijective.

This requires the other peers also to accept sharing their data without restriction.

In practice, a request for initialization of the list of "friends" is sent to the central server S. The latter notifies the addressees in the network of this request.

When they are connected, these addressees have the choice of accepting or refusing to belong to the list of "friends" of the terminal in question.

This acceptance or refusal is received by the central server S, which stores the information and also retransmits it to the peer during a response step E35.

The list of the "friends" peers of each peer in the communication network is thus established both at each terminal and at the central server S.

A content creation step E36 is next implemented at the peer initiating its connection to the system.

This content creation step E36 identifies all the data collections which the user of the terminal wishes to share with the other peers in the system.

These shared data each receive a unique identifier in the system and this content identifier is sent to the central server S.

A registration step E37 stores the content identifiers in association with the identifier $U_p$ of each peer.

The central server S also has the possibility of requesting additional information from the peer, in particular according to the nature of the data to be shared.

For example, when it is a case of a collection from a set of digital photographs, the central server S can store low-resolution versions of the images to be shared, in order to provide a minimum quality of service.

Finally, a data sharing step E38 can be implemented by the peer.

In particular, the user of the terminal can share certain data contents with a set of peers listed on a broadcast list.

This broadcast list and the identification of the contents to be shared are transmitted to the central server S which, in a notification step E39, notifies the addressees of the shared contents.

Thus these addressees, when they are connected to the system, will take cognizance of this notification of a new collection of data to be displayed. The request for this collection and its obtaining via a communication network will be described subsequently, with reference to FIGS. 5 and 6.

The various exchanges between a peer in a network and the central server, when there is a subsequent connection of this peer, will now be described with reference to FIG. 4.

An authentication step E40 is first of all implemented using the unique identifier Up of the peer in the system.

This identifier is of the login type, and comprises the name of the user and the password.

This identifier, as well as certain local data on the terminal, are sent to the central server.

A verification step E41 checks the identity of the peer and if necessary updates the data relating to the connection of this peer to the system.

The central server S can then send to the terminal connected all the notifications awaiting, which are intended for it.

Figure 3:
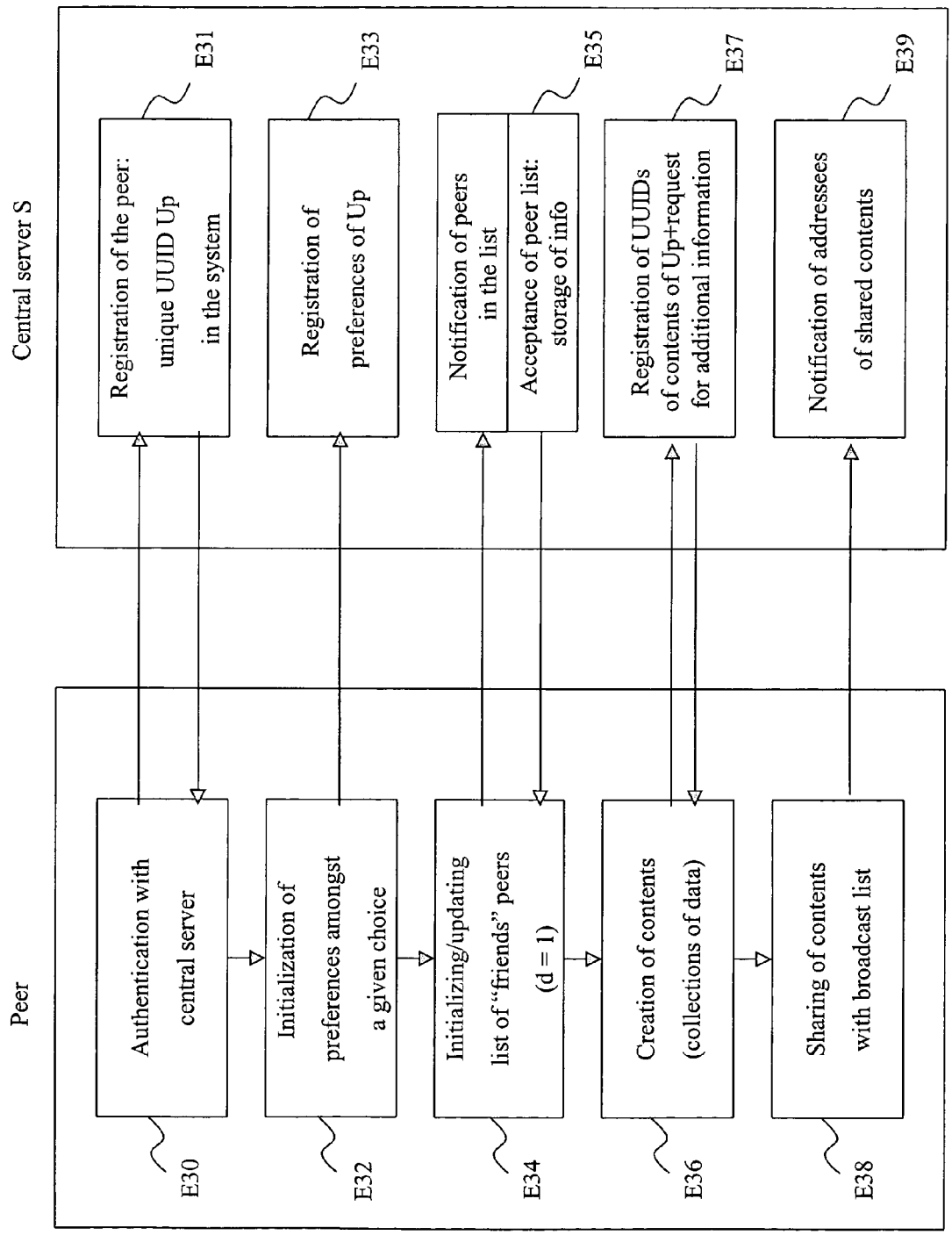
FIG. 3 is a block diagram illustrating the exchanges between a terminal and a server when a connection of the said terminal is initiated.

In particular, the central server S sends the notifications of the "friends" requests, corresponding to the notifications sent by the central server at the notification step E35 in FIG. 3.

During a reception step E42, the connected peer receives the "friends" request notifications and returns a response signifying his acceptance or refusal.

On reception of this response, the central server S sends a response to each peer concerned in a sending step E43 and also stores this information in its database.

At the same time, during the reception step E42, the connected peer stores in its own list of "friends" the identification of the new "friend" peer in the network when it has accepted the notification.

A notification step E44 is then implemented at the central server in order to notify new collections of data to be shared.

A reception step E45 is symmetrically implemented on the connected peer in order to receive the notifications identifying the new data to be shared.

Various steps of consultation E46 and content sending E47 are then implemented between the connected peer and the central server so that the peer can receive the content of the data.

These consultation and sending steps E46, E47 will be described below in relation to the allocation method according to the invention and illustrated in FIGS. 5 and 6.

The connected peer can also implement a step E48 of sharing a new content, by sending content sharing notifications via the central server.

A notification step E49 is then implemented by the central server S in order to inform the addressee of the contents to be shared.

It should be noted that these steps of sharing new contents E48, E49 are identical to the content sharing steps E38, E39 in FIG. 3.

These content sharing steps can be implemented at any time in the connection of a peer to the computer communication network.

There will now be described, with reference to FIG. 5, a content request method implemented by each peer in the communication network during a consultation step E46 as described previously in FIG. 4.

In this first embodiment, the content request is sent to the central server S.

This relates to the example illustrated in FIG. 2a, in which a peer D requests a content C0 available on terminals A, C in direct relationship with this peer D but which are not connected.

On the other hand, this content C0 is available on the terminal E, to which however the peer D cannot connect directly.

In practice, the peer D first of all implements a step E50 consisting of an attempt at direct connection to peers in the communication network.

This direct connection step can be implemented for example using the distribution list of the collection C1 in which the content C0 was sent.

Referring to FIG. 2b, it is a case in this example of the peers A, B and C.

Naturally other types of direct connection can be envisaged, in particular when this distribution list is not published.

In such a case, the peer D can attempt to connect directly to the users of the communication network which are referenced in its list of "friends", that is to say in this example to the peers A and C as illustrated in FIG. 2a.

If this direction connection attempt step E50 has succeeded, a step E52 of allocating the content C0 is proceeded with in a known manner, by virtue of a request-response exchange between the peer D and the identified peer able to serve the requested content C0.

If at the end of the test step E51 the direct connection attempt has failed, a step E53 of sending a request to the central server S is implemented in order to request the content C0.

By virtue of the various information stored on the central server S, the latter identifies, in an identification step E54, the content C0 on a peer E connected at this moment to the communication network.

A calculation step E55 is then implemented by the server S in order to calculate the distance d0 separating the peers D and E in the communication network.

This calculation of the distance existing between the two peers D and E can be used as described previously with reference to FIG. 2a.

A verification step E56 is also implemented on the central server S in order to check the access rules given by the peer E during its initialization phase with the central server.

In particular, it is checked whether the peer E is adapted to allocate a service to a peer D distant by a distance equal to d0.

In this first embodiment, it is the central server S, which centralizes the information concerning the system, which has the possibility of verifying the feasibility of a positive response to a request for a content C0.

A test E57 thus makes it possible, at the central server, to know whether the peer E can at least partially serve the content C0 to the peer D.

If not, a step E58 of sending a response by the server S makes it possible to inform the peer D that the content C0 is not available.

If at the test step E57 the peer E is adapted to at least partially serve the content C0 to the peer D, the central server S, in a sending step E59, sends a notification to the peer E.

This notification comprises the identifier of the peer D, requesting the content C0, and the value of distance between this peer E and the peer D, corresponding to the distance d0 calculated at the calculation step E55.

Next a sending step E60 is also implemented by the central server in order to send the address of the peer E and possibly the value of distance d0 to the peer D.

These two notifications sent respectively to the peers E and D then enable the two peers in the communication network to communicate directly.

In practice, a step E61 of sending a request for the content C0 is implemented by the peer D intended for the peer E.

Then the peer D receives, during a reception step E62, the part f(C0, d0) of the content C0 corresponding to the type of service allocated by the peer E to a peer distant by the distance d0.

This allocation of a server by the peer E according to the distance d0 will now be described with reference to FIG. 6, according to the first embodiment of the invention.

This allocation method comprises first of all a step E63 of receiving a notification identifying the peer D as the client of a content and the distance d0 associated with this peer D.

This reception step E63 corresponds to the reception of the notification sent by the central server S in a previously described sending step E59.

On reception of this notification, the value of the distance d0 is read.

In addition, a step E64 of receiving a request for content C0 is also implemented on the peer E.

This reception step E64 corresponds to the reception of the request sent by the peer D during the sending step E61.

A selection step E65 is then implemented on the peer E in order to identify a service according to the distance d0 read in the notification received at the reception step E63.

When it is a case of digital images, this selected service can correspond to a resolution level of the image C0 to be sent to the peer D.

In practice, this selection is carried out using the value of the distance d0, from amongst a set associating services and distance. A table of associations can thus store each distance in association with a service.

A sending step E66 then sends the part f(C0, d0) of the content C0 according to the service selected.

Figure 5:
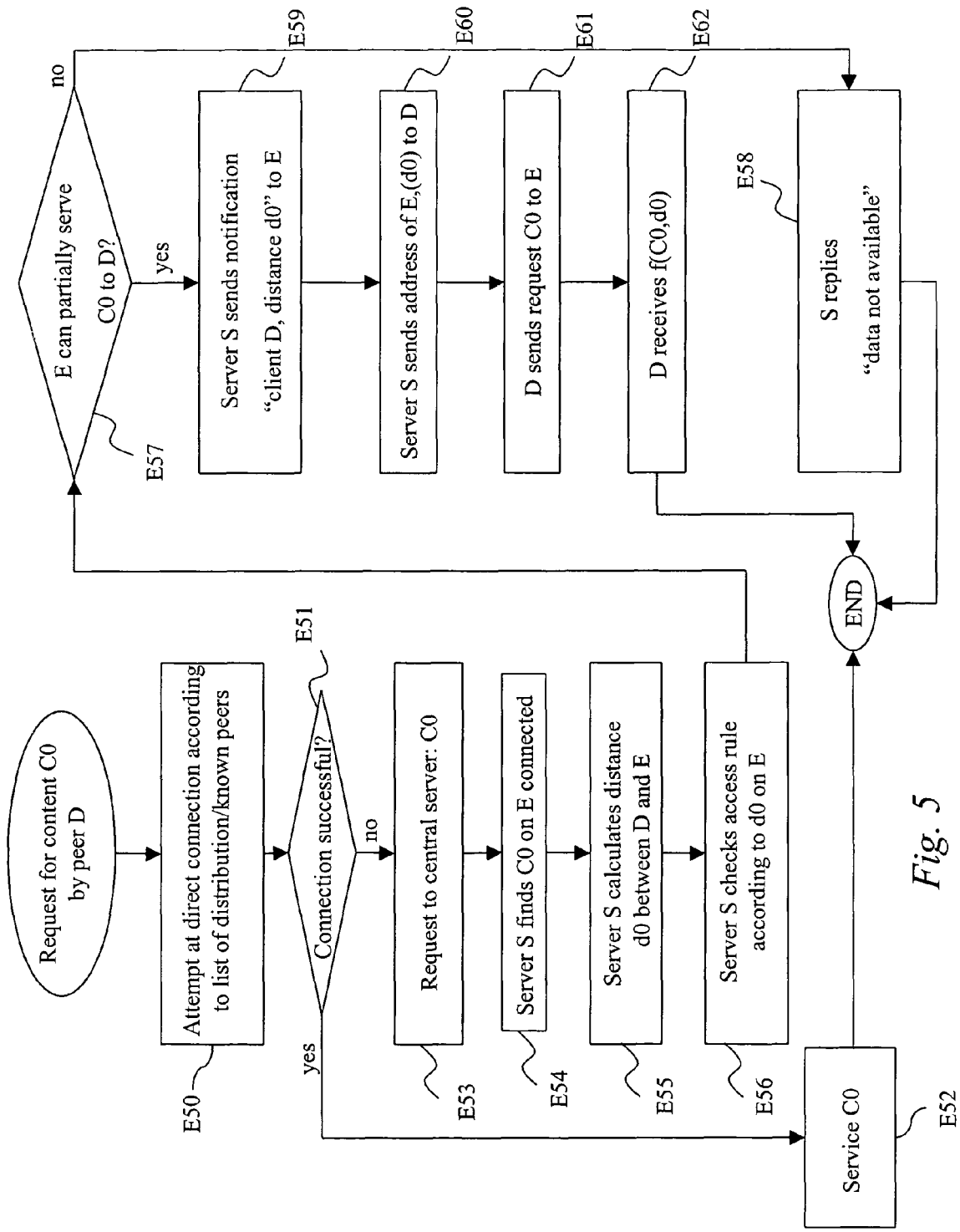
FIG. 5 is an algorithm illustrating the steps of a request for a service between a terminal and a server according to a first embodiment of the invention.
Figure 6:
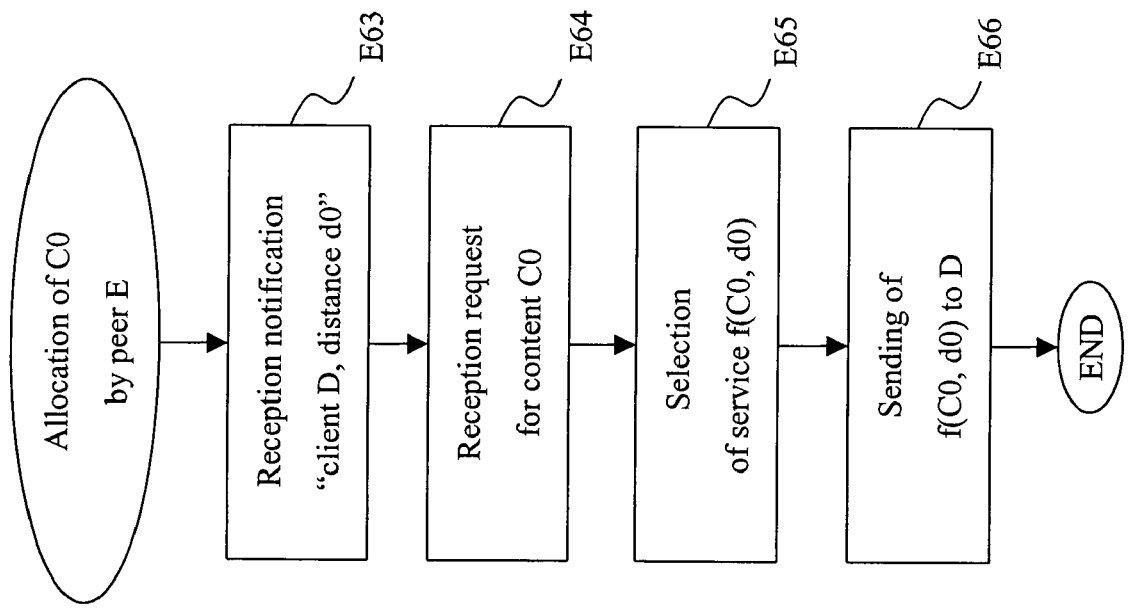
FIG. 6 is an algorithm illustrating the method of allocating a service according to this first implementation of the invention.

In this first example embodiment illustrated in FIGS. 5 and 6, it was considered that only one peer E was available to supply the content C0 to the peer D.

Naturally, if several peers are identified by the central server S during the identification step E54, all of steps E55 to E62 in FIG. 5 are reiterated for each peer identified, in particular if at the test step E57 the peer in question cannot at least partially serve the peer D with the content C0.

Figure 7:
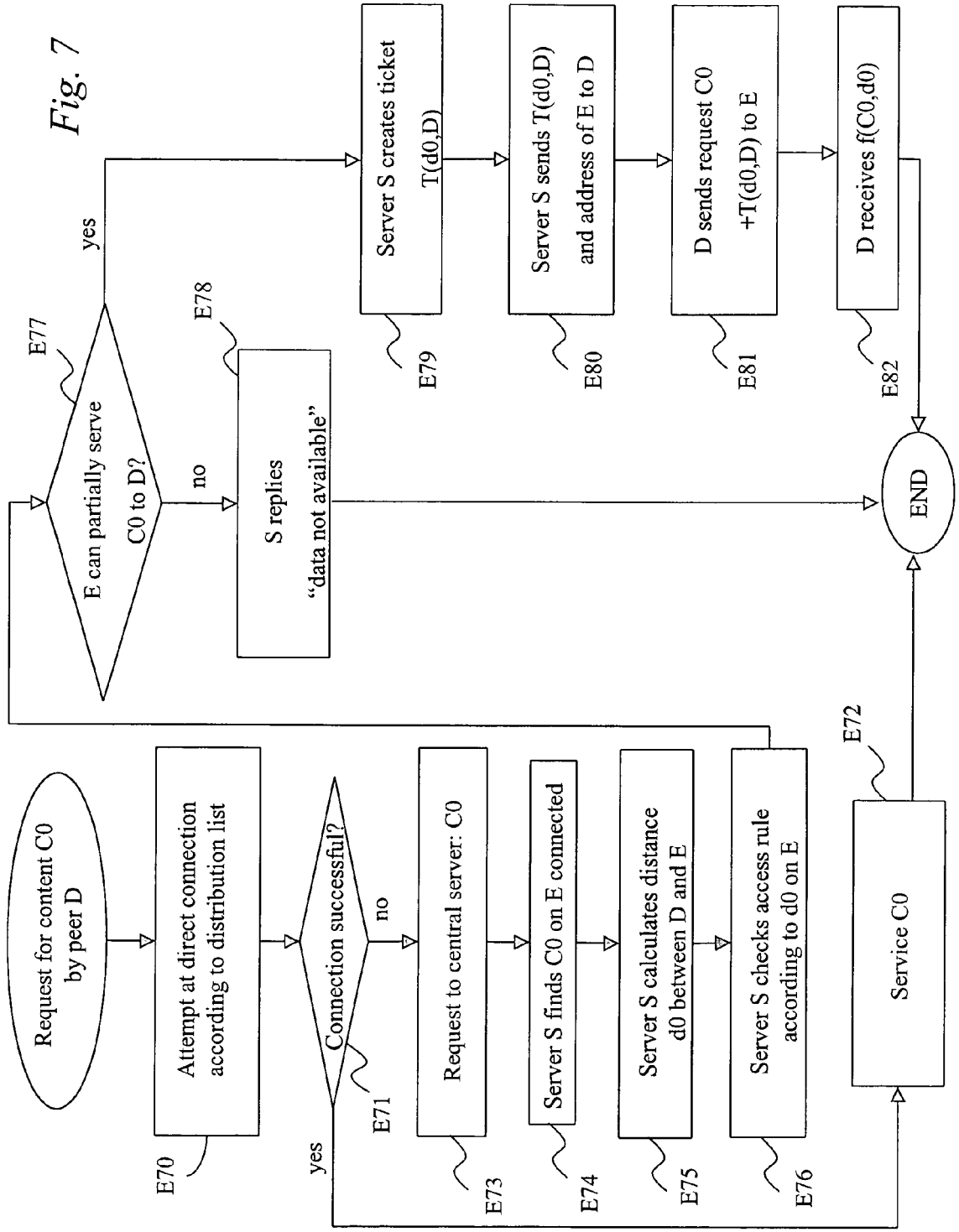
FIG. 7 is an algorithm illustrating the steps of a request for a service between a terminal and a server according to a second embodiment of the invention.

A second embodiment of the invention, in which the service allocation method uses an electronic ticket, will now be described with reference to FIGS. 7 and 8.

This electronic ticket makes it possible to protect access to resources on a computer.

The use of such an electronic ticket is in particular described in the document U.S. Pat. No. 5,542,046.

In this second embodiment, the steps implemented for the requesting of a content C0 by the peer D are substantially identical to those implemented and described above with reference to FIG. 5.

In particular, steps E70 to E78 correspond respectively to the previously described steps E50 to E58.

On the other hand, here, when at the end of the test step E77 the central server S determines that the peer E can at least partially serve the content C0 to the peer D, a step E79 of creating an electronic ticket is implemented by the central server S.

This electronic ticket T (d0, D) contains the identifier of the peer D and the distance corresponding to the distance d0.

In addition, if each peer in the system has a (public key, private key) pair, the central server can encrypt the electronic ticket with the public key of the terminal E. This encrypting further increases the level of security of the transfer of data between the peers in the communication network.

A sending step E80 is then implemented by the central server S in order to send the ticket T (d0, D) to the peer D.

The central server S also sends the electronic address of the peer E to the peer D.

The peer D then sends, in a sending step E81, a request for the content C0, as well as the electronic ticket T (d0, D) intended for the peer E.

In response, the peer D receives, in a reception step E82, the at least partial content of the image C0, as allocated by the peer E according to the distance d0 existing between the peer E and the peer D.

Figure 8:
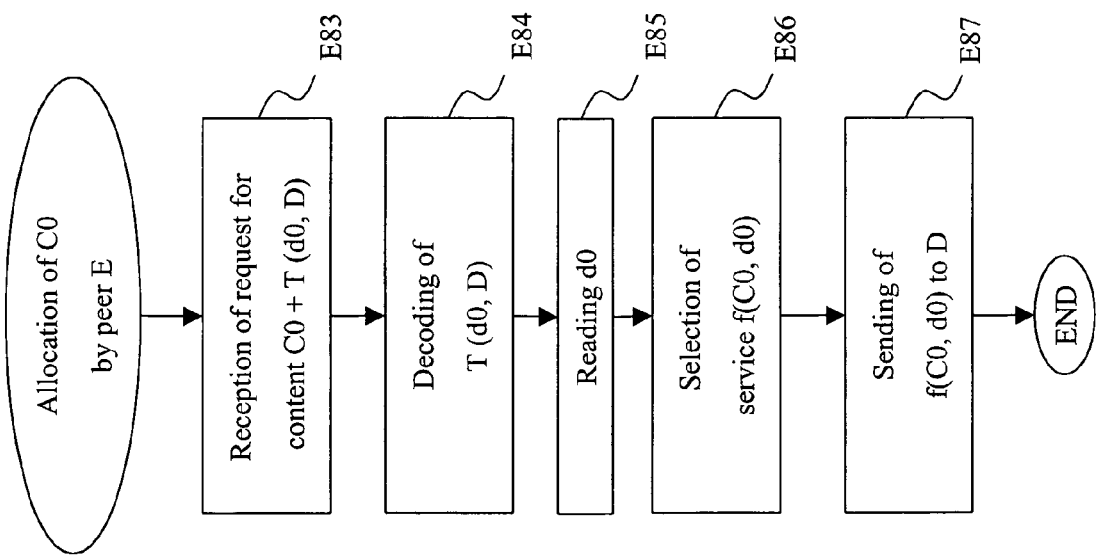
FIG. 8 is an algorithm illustrating the method of allocating a service according to this second embodiment of the invention.

This allocation of the service by the peer E is described more particularly with reference to FIG. 8.

This allocation method comprises first of all a step E83 of receiving the request for the content C0 and the electronic ticket T (d0, D) corresponding to the sending step E81 implemented by the peer D.

A decoding step E84 is implemented by the peer E in order to access the data inserted in the electronic ticket T (d0, D).

This decoding decrypts the link value d0, which can thus be read in a reading step E85 by the peer E.

According to this link value d0, a selection step E86 is implemented by the peer E in order to select the service allocated by this peer E to the peer D.

As previously, this selection of service can for example correspond to a given resolution level of the digital image C0.

A sending step E87 is then implemented in order to send the content f(C0, d0) to the peer D.

Thus, by virtue of the invention, it is possible for the peer D to access the content C0 stored on a peer E not forming part of the same group of peers, whilst allowing restricted access to the data stored on E, in order to protect the sharing of data on the communication network.

There will now be described, with reference to FIGS. 9 and 10, a third embodiment of the invention which makes it possible to limit the intervention of the central server S.

In summary, in this third implementation, each peer in the communication network stores and manages locally the list of these "friends" peers.

In this embodiment, the list of "friends" peers is not limited to the terminals distant by a distance d equal to 1 but also comprises terminals where the distance separating them from the peer in question remains less than a maximum distance dmax beyond which the peer no longer agrees to allocate a service.

Figure 9:
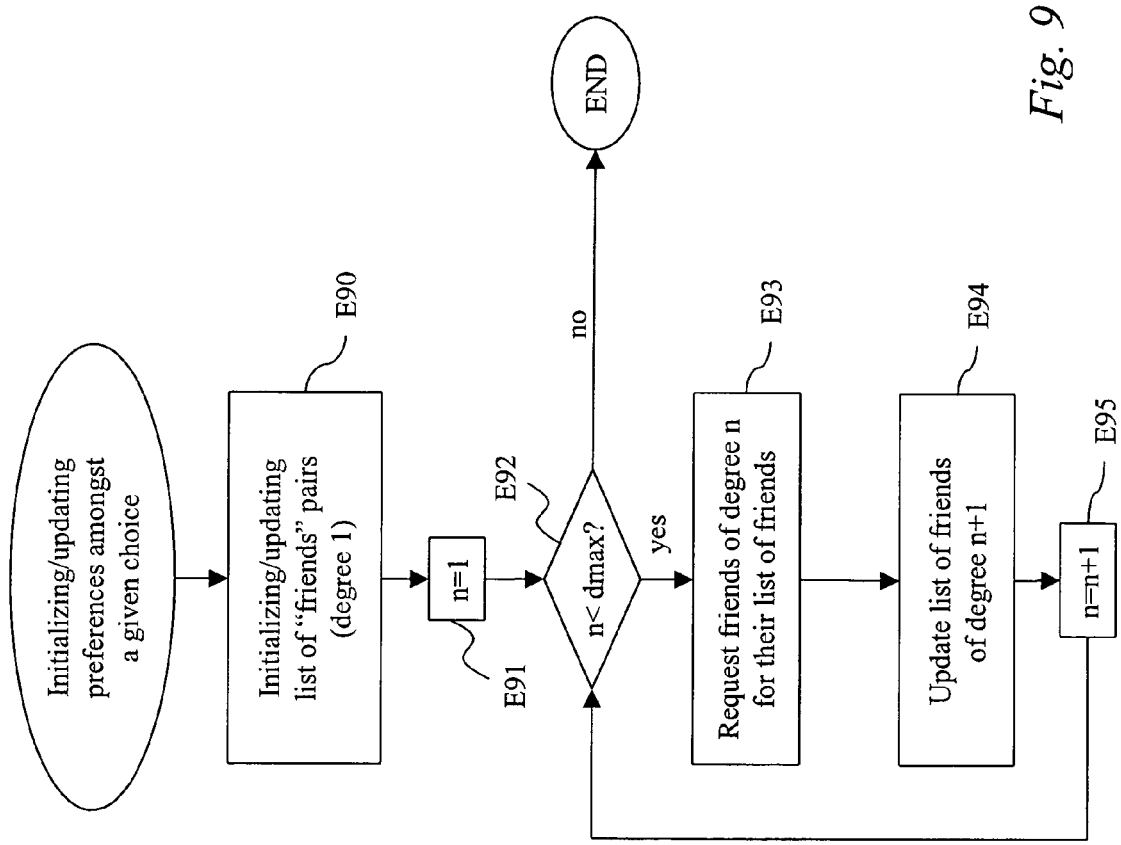
FIG. 9 is an algorithm illustrating the steps of initiating a connection of a terminal to the communication network according to a third embodiment of the invention.
Figure 10:
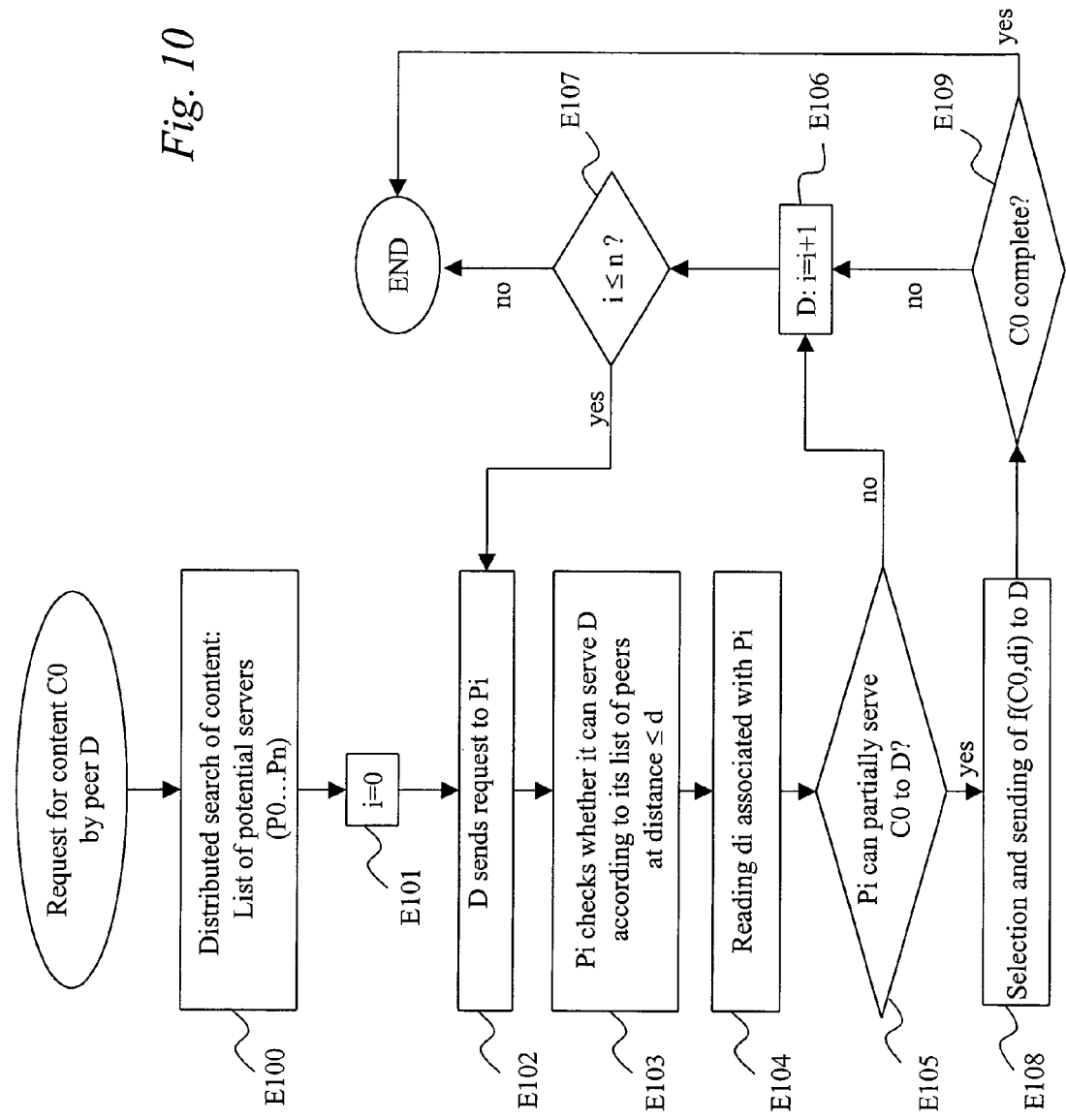
FIG. 10 is an algorithm illustrating the method of allocating a service according to the third embodiment of the invention.

FIG. 9 illustrates the initialization phase implemented during this third embodiment, making it possible to establish the list of "friends" peers where the value of the distance remains below the maximum value dmax.

A step E90 of initializing and updating a list of direct "friends" peers comprising the terminals connected directly to the peer in question is first of all implemented. This initialization step E90 is similar to that described previously with reference to steps E34, E35 in FIG. 3.

Next a step E91 of initializing an index n is implemented. The index n is here equal to 1.

It is checked in a test step E92 whether the value of the index n is below the maximum threshold value dmax.

In the affirmative, a sending step E93 makes it possible to request, from the peers whose distance is equal to n, their own list of "friends".

On reception of these lists of "friends", an updating step E94 locally updates the list of "friends" by integrating in this the list of "friends" received from the "friends" peers.

An incrementation step E95 is next implemented in order to increment the index n to the value n+1.

All of steps E92 to E95 are then reiterated for this new index value in order to increase the list of "friends" peers.

When the value of the index n is equal to the threshold value dmax, the initialization process is terminated.

It is then considered that the list of the "friends" peers of degree dmax is complete locally at the peer.

Naturally, this list can be updated regularly by the peer by performing the same steps as described previously during initialization.

It should be noted that, between the sending step E93 and the updating step E94 implemented on the terminal, there may possibly elapse a period of time since the sending by a peer of its list of "friends" can take place only after connection thereof.

Alternatively, in this initialization phase, recourse can be had to the central server S in order to collect and send the list of "friends" peers of each peer which is not connected to the communication network at the moment in question.

It should also be noted that, in this embodiment, it is not necessary for each peer to give an authorization in order to appear in a list of "friends" of another peer since the relationship between two peers in a network for the allocation of a service is not necessarily bijective.

The process implemented for collecting the content C0 by the peer D when each peer has available the list of peers in the communication network which it can serve will now be described with reference to FIG. 10.

A first search step E100 is implemented in order to effect a distributed search of the content C0 on the communication network.

The peer D then receives a list of potential servers $(P_0, \ldots, P_n)$.

An index value i is then initialized to the value 0 during an initialization step E101.

A sending step E102 is then implemented in order to send a request for the content C0 to the potential server Pi.

This server Pi checks in a reading step E103 whether the peer D is present in its local list of "friends" peers which it can serve.

If it is present in this list of "friends" peers, it also reads, in a reading step E104, the distance di separating this peer Pi from the peer D.

A test step E105 is then implemented on the server Pi in order to check whether it can at least partially serve C0 to the peer D.

If not, a response is sent to the peer D, which then, in an incrementation step E106, increments the value of the index i to the value i+1.

A test step E107 checks whether this new index value remains less than or equal to the value n corresponding to the maximum number of potential servers identified at the distributed search step E100.

In the affirmative, steps E102 to E105 are reiterated for a following server Pi.

When at the end of the test step E105 the server Pi can partially serve the content C0 to the peer D, a selection and sending step E108 is implemented by the server Pi in order to at least partially send the content C0 to the peer D.

This selection of services takes place as before from a list of various services associated respectively with distance.

The service is selected from the distance di.

This content f(C0, di) is sent to the peer D, which in a test step E109 checks whether the content C0 received is complete.

If not, the content request not being completely satisfied, the peer D continues to seek the complete content C0 amongst the potential servers.

In practice, the incrementation E106 and test E107 steps are reiterated in order to identify a following potential server and step E102 et seq are reiterated at this following potential server.

When at the end of the test E109 the content C0 is complete, or when at the end of the test E107 the value of the index i is equal to the maximum value n, the process of requesting the content C0 ends.

This third embodiment of the invention thus makes it possible to distribute a content on the communication network, according to the distance separating two peers, whilst limiting recourse to the central server S.

This is because, in this embodiment, the central server S does not intervene in obtaining a content.

Figure 11:
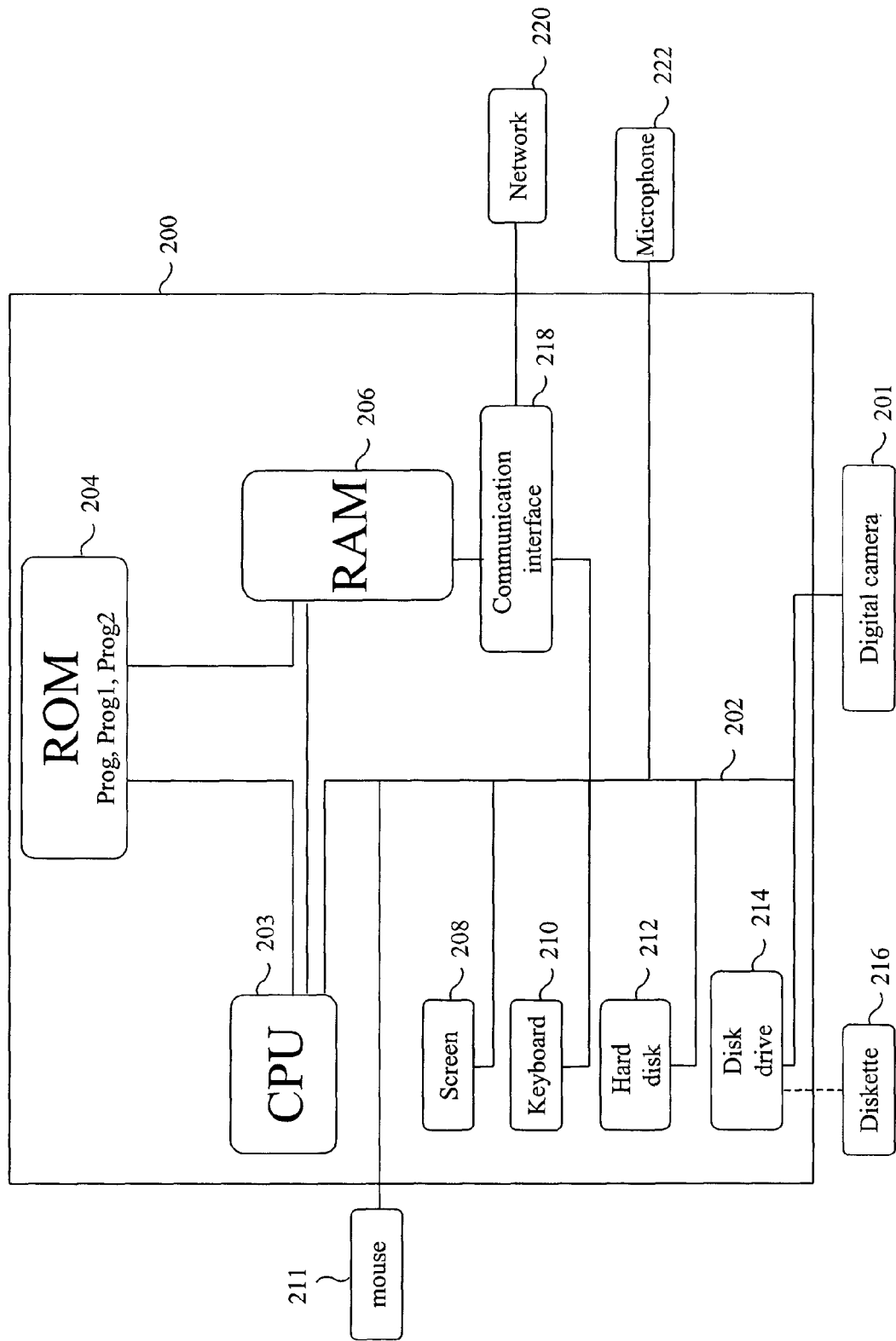
FIG. 11 is a block diagram of a device adapted to implement the invention.

All the methods of requesting content and allocating a service described above can be implemented in a device as illustrated in FIG. 11, corresponding to a computer terminal.

This device 200 may for example be a microcomputer or a work station connected to various peripherals such as, for example, a digital camera 201, or any other image acquisition means and in particular a scanner.

This digital camera 201 is connected to the microcomputer 200 via a graphics card adapted to supply to the apparatus multimedia data and in particular digital images.

The microcomputer 200 comprises a communication bus 202 to which there are connected:
- a central processing unit 203, comprising the microprocessor;
- a read only memory 204 adapted to store programs "Progr", "Progr1" and "Progr2", for implementing the service allocation method according to the invention; and
- a random access memory 206 corresponding to the cache memory of the microcomputer and comprising registers adapted to record and store variables and parameters created and modified during the execution of the aforementioned programs.

A screen 208 also displays data and/or serves as a graphical interface with a user, who will be able to interact with the programs according to the invention by means for example of a keyboard 210, or any other means such as a pointing device such as for example a mouse 211 or an optical pen.

A hard disk 210 can also contain the aforementioned programs "Progr", "Progr1", "Progr2".

In a conventional manner, a disk drive 214 is adapted to receive a diskette 216 so as to read or write data.

A communication interface 218 is also adapted to connect the microcomputer 200 to a distributed communication network 220 such as for example the Internet.

This interface 218 is able to transmit and receive data and in particular all the requests sent and received when the methods described above are implemented.

In the case of audio data, the device 200 also comprises an input/output card (not shown) connected to a microphone 222.

The communication bus 202 affords communication and interoperability between the various elements included in the microcomputer 200 or connected thereto.

The representation of the bus is not limiting and in particular the central unit 203 is able to communicate instructions to any element of the microcomputer 200 directly or by means of another element of the microcomputer 200.

The executable code of each program enabling the programmable apparatus to implement the methods according to the invention can be stored, for example, in the hard disk 212 or in the read only memory 204.

According to a variant, the diskette 216 can contain data as well a the executable code of the aforementioned programs which, once read by the apparatus 200, will be stored in the hard disk 212.

In a second variant, the executable code of the programs can be received by means of the communication network 220, via the interface 218, in order to be stored in an identical fashion to that described above.

Naturally the diskettes 216 can be replaced by any other information medium such as for example a compact disk (CD-ROM) or memory card.

In general terms, any information storage means which can be read by a computer or by microprocessor, integrated or not into the apparatus, possibly removable, can be adapted to store one or more programs whose execution enables the service allocation method according to the invention to be implemented. In more general terms, this program or programs can be loaded into storage means of the apparatus 200 before being executed.

The central unit 203 will control and direct the execution of the instructions or portions of software code of the program or programs according to the invention. On powering up, the programs which are stored in a non-volatile memory, for example the hard disk 212 or the read only memory 204, are transferred into the random access memory 206, which will then contain the executable code of the program or programs according to the invention as well as registers for storing the variables and parameters necessary for implementing the invention.

It should be noted that the communication apparatus comprising the device according to the invention may also be a programmed apparatus.

This apparatus will then contain the code of the computer program or programs for example fixed in an application specific integrated circuit (ASIC).

Naturally many modifications can be made to the example embodiment described above without departing from the scope of the invention.

Thus it has been considered in the above example embodiments that only one user was associated with each terminal, thus constituting a peer in the network.

Naturally several users could use the same terminal or machine, several peers thus being identified with its preferences and data contents associated with the same node of the communication network.

The invention claimed is:

1. A method of allocating at least one service by a first peer to a second peer, the first and second peers being linked by means of a computer communication network, said first and second peers belonging respectively to a first and second group of peers adapted to share data, comprising the steps of:
   initializing preferences of said first peer, wherein said preferences comprise a set of associations which define associations between a service and a distance in a connection graphic of peers;
   evaluating a distance between said first and second peers, wherein said distance between said first and second peers is a distance separating nodes in the connection graphic of peers;
   selecting, by said first peer, a service supplied by said first peer, said service being selected according to the evaluated distance from among said set of associations consisting of the service and the distance; and
   allocating said selected service to said second peer.

2. The method according to claim 1, wherein the evaluation step comprises a step of receiving a notification sent by a central server in said computer communication network, said notification comprising a value of said distance and an identifier of said second peer on the computer communication network.

3. The method according to claim 1, wherein the evaluation step comprises a step of reading a value of said distance associated with said second peer among a list of associations of peers and distances.

4. The method according to claim 1, wherein the evaluation step comprises a step of receiving an electronic ticket sent by said second peer, comprising an identifier of said second peer and the distance between the first and second peer.

5. The method according to claim 1, wherein said set of associations is bounded by a threshold value.

6. The method according to claim 1, wherein the shared data is represented at multiple resolution levels, and said services to be allocated correspond to various resolution levels of the data to be shared between the first group and the second group of peers.

7. The method according to claim 6, wherein the shared data are digital images.

8. The method according to claim 1, wherein the shared data are compressed digital images to the JPEG 2000 format, and said services to be allocated correspond to various levels of visual quality of the data to be shared between the first and second group of peers.

9. A device for allocating at least one service by a first peer to a second peer, the first and second peers being connected by means of a computer communication network, said first and second peers belonging respectively to a first and second group of peers adapted to share data, the device comprising:
   initialization means for initializing preferences of said first peer, wherein said preferences comprise a set of associations which define associations between a service and a distance in a connection graphic of peers;
   evaluation means for evaluating a distance between said first and second peers, wherein the distance between the first and second peers is a distance separating nodes in the connection graphic of peers;
   selecting means for selecting, by said first, peer a service supplied by said first peer, said service being selected according to the evaluated distance from among said set of associations consisting of the service and the distance; and
   allocating means for allocating said selected service to said second peer.

10. The device according to claim 9, wherein the evaluation means comprises means for receiving a notification sent by a central server in said computer communication network, said notification comprising a value of said distance and an identifier of said second peer on the computer communication network.

11. The device according to claim 9, wherein the evaluation means comprise means for reading a value of said distance associated with said second peer among a list of associations of peers and distances.

12. The device according to claim 9, wherein the evaluation means comprise means for receiving an electronic ticket sent by said second peer, comprising an identifier of the second peer and the distance between the first and second peers.

13. The device according to claim 9, further comprising:
   a microprocessor;
   a read only memory adapted to store a service allocation program; and
   a random access memory comprising registers adapted to store variables during the execution of said program.

14. The device according to claim 9, wherein the device is incorporated in a terminal in a computer communication network.

15. A computer comprising the device according to claim 9.

16. A communication network comprising the device according to claim 9.

17. A computer-readable storage medium on which is stored a computer-executable program that, when executed by a computer, performs a method of allocating at least one service by a first peer to a second peer, the first and second peers being linked by means of a computer communication network, said first and second peers belonging respectively to a first and second group of peers adapted to share data, the program comprising the steps of:
   initializing preferences of said first peer, wherein said preferences comprise a set of associations which define associations between a service and a distance in a connection graphic of peers;
   evaluating a distance between said first and second peers, wherein said distance between said first and second peers is a distance separating nodes in the connection graphic of peers;
   selecting by said first peer a service supplied by said first peer, said service being selected according to the evaluated distance from among said set of associations consisting of the service and the distance; and
   allocating said selected service to said second peer.

18. The method according to claim 1, wherein said set of associations the service and the distance is stored in a table on said first peer.

19. The method according to claim 1, wherein said preferences also comprise a set of associations which define associations between a degressive service and a distance in the connection graphic of peers.

20. The method according to claim 1, wherein the distance in said graphic of peers corresponds to a minimum number of arcs which connect two nodes in the connection graphic of peers, said two nodes representing respectively two peers in the communication network.

21. The method according to claim 1, further comprising a peer initialization step to establish a list of peers forming a group of peers adapted to share data.

22. The method according to claim 1, further comprising a peer initialization step for said first peer and said second peer to establish, respectively, said first group of peers and said second group of peers adapted to share data without service restriction.

23. A method of allocating at least one service by a first peer to a second peer, the first and second peers being linked by means of a computer communication network, said first and second peers belonging respectively to a first and second group of peers adapted to share data, comprising the steps of:

initializing preferences of said first peer, wherein said preferences comprise a set of associations which define associations between a service and a distance in a connection graphic of peers;

evaluating a distance between said first and second peers, wherein said distance between said first and second peers is a distance separating nodes in the connection graphic of peers;

selecting, by said first peer, a service supplied by said first peer, said service being selected according to the evaluated distance from amongst said set of associations consisting of the service and the distance; and allocating said selected service to said second peer;

wherein said set of associations is bounded by a threshold value which is set as a peer preference in the initializing step and corresponds to a maximum distance beyond which the peer does not allocate any service to another peer.

* * * * *